(12) United States Patent
Elfindale

(10) Patent No.: US 10,849,308 B2
(45) Date of Patent: Dec. 1, 2020

(54) PET SANITATION DEVICE

(71) Applicant: Aquilla Elfindale, Kansas City, MO (US)

(72) Inventor: Aquilla Elfindale, Kansas City, MO (US)

( * ) Notice: Subject to any disclaimer, the term of this patent is extended or adjusted under 35 U.S.C. 154(b) by 228 days.

(21) Appl. No.: 15/919,338

(22) Filed: Mar. 13, 2018

(65) Prior Publication Data
US 2018/0199537 A1 Jul. 19, 2018

Related U.S. Application Data

(63) Continuation-in-part of application No. 14/827,498, filed on Aug. 17, 2015, now Pat. No. 9,913,453.

(60) Provisional application No. 62/037,772, filed on Aug. 15, 2014.

(51) Int. Cl.
*A01K 1/01* (2006.01)

(52) U.S. Cl.
CPC ............ *A01K 1/011* (2013.01); *A01K 1/0114* (2013.01)

(58) Field of Classification Search
CPC ........ A01K 1/01; A01K 1/0107; A01K 1/011; A01K 1/0114; A01K 1/0128; A01K 1/0132; A01K 1/0152
USPC ................. 119/161, 165, 166, 163
See application file for complete search history.

(56) References Cited

U.S. PATENT DOCUMENTS

| | | | |
|---|---|---|---|
| 1,665,789 A * | 4/1928 | Nichols | B01F 7/00016 416/219 R |
| 3,963,220 A | 6/1976 | Ohchi | |
| 4,574,735 A * | 3/1986 | Hohenstein | A01K 1/0114 119/163 |
| 4,941,750 A | 7/1990 | Bouchez et al. | |
| 5,048,465 A | 9/1991 | Carlisi | |
| 5,662,066 A | 9/1997 | Reitz | |
| 5,996,533 A | 12/1999 | Gordon | |
| 6,532,900 B1 | 3/2003 | Wang | |
| 6,561,131 B1 * | 5/2003 | Schwartz | A01K 1/011 119/161 |
| 6,568,348 B1 | 5/2003 | Bedard | |
| 6,701,868 B1 | 3/2004 | Shepherd | |

(Continued)

FOREIGN PATENT DOCUMENTS

FR 2 630 295 10/1989
WO WO 1999/57967 5/1999

OTHER PUBLICATIONS

English Abstract of FR 2 630 295. Translation obtained from Lexis-nexis Total Patent on May 26, 2017.

*Primary Examiner* — Lisa L Tsang
(74) *Attorney, Agent, or Firm* — Woodard, Emhardt, Henry, Reeves & Wagner, LLP

(57) ABSTRACT

A pet sanitation device provides a litter-containing basket in a housing, with a spinner/agitator in the basket. After a pet uses the device, the housing and basket are filled with water to dissolve waste in the litter, and the spinner/agitator is caused to spin at a first, relatively slower speed within the basket to help break-up the waste. The basket is then caused to spin at a second, relatively faster speed in the housing, and this second spinning motion produces centrifugal forces that force the wastewater outward from the basket and into the space between the basket and the housing. The wastewater is drained from the housing, leaving the device ready for a subsequent use.

4 Claims, 6 Drawing Sheets

(56) References Cited

U.S. PATENT DOCUMENTS

| | | | |
|---|---|---|---|
| 8,413,608 B2* | 4/2013 | Sharp | A01K 1/011 119/166 |
| 2005/0235920 A1* | 10/2005 | Brokaski | A01K 1/0114 119/166 |
| 2007/0125309 A1 | 6/2007 | Gordon et al. | |
| 2007/0227457 A1 | 10/2007 | Waters | |
| 2008/0017123 A1* | 1/2008 | Chin | A01K 1/011 119/166 |
| 2010/0293741 A1* | 11/2010 | Ferris | A01K 1/01 15/339 |
| 2013/0333625 A1* | 12/2013 | Baxter | A01K 1/0114 119/166 |
| 2019/0200578 A1* | 7/2019 | Chang | A01K 1/01 |

* cited by examiner

PET SANITATION DEVICE

CROSS-REFERENCE TO RELATED APPLICATIONS

This application is a continuation-in-part of U.S. patent application Ser. No. 14/827,498, filed Aug. 17, 2015, which claims the benefit of U.S. Provisional Patent Application Ser. No. 62/037,772, filed Aug. 15, 2014. The entire contents of all related applications are hereby incorporated herein by reference.

BACKGROUND TO THE INVENTION

Litter boxes are commonly used where pets are kept indoors, and allow pets to urinate and/or defecate without soiling the room. The pet owner then scoops the waste from the box and disposes of it appropriately. Clumping litters are used to allow both solid and liquid waste to be disposed of in this manner.

Many pet owners would prefer not to have to scoop a litter box. Accordingly, devices that scoop the box automatically have been developed and provide a benefit to many pet owners. For example, the ScoopFree® Self-Cleaning Litter Box rakes the litter automatically and pushes the waste to a container that can easily be removed. Similarly, the Hagen Catlt SmartSift Litter Box uses a sifter controlled by a lever to sift through the litter. Clean litter falls through sifter, while waste clumps are deposited into a waste bin below.

The CatGenie 120 Cat litter box uses washable litter granules instead of disposable litter. The granules are contained in the litter box, where a rake separates and scoops solids into a hopper. Solid wastes are treated with a solution that liquefies them, and liquid waste drains through the granules to a reservoir. The liquid waste and liquefied solids are then flushed away.

The devices presently known to the art do not satisfactorily remove all waste without substantial effort. A need therefore exists for a device that is more automatic and effective. The present invention addresses that need.

SUMMARY OF THE INVENTION

One aspect of the present invention is a pet sanitation device comprising a basket in a housing. A spinner/agitator is provided in the basket, and the basket is provided with a washable particulate litter material which is preferably 10 mm-12 mm glass beads. After a pet uses the device, the housing and basket are filled with water to dissolve waste in the litter, thus producing wastewater. The spinner/agitator is then caused to spin in the basket at a first, relatively slower speed effective to break-up waste material through the action of the washable particulate litter material agitating against the waste. The basket is then caused to spin in the housing at a second, relatively faster speed effective to create centrifugal forces sufficient to force the wastewater outward from the basket and into the space between the basket and the housing. The wastewater is drained from the housing, leaving the device ready for a subsequent use.

In one preferred embodiment the device comprises:
a) a housing comprising a water-retaining sidewall and a water-retaining floor with a drain effective to drain water from the housing;
b) a basket positioned within said housing and spaced apart from said housing, the basket comprising a bowl with openings to allow water to drain from the sides and bottom of the basket upon rotation of the basket, and defining a central axis;
c) a spinner/agitator positioned within the basket and adapted to spin around said central axis and effective to agitate washable particulate material in the basket;
d) a washable particulate material contained in the basket;
e) a motor effective for selectively spinning the basket and/or the spinner/agitator about said central axis;
f) a spinning control mechanism effective to control the timing and speed at which the spinner/agitator spins within the basket and the timing and speed at which the basket spins within the housing, wherein said spinning control is effective to provide:
  i) a non-spinning mode in which the spinner/agitator does not spin within the basket and the basket does not spin within the housing;
  ii) a first spinning mode in which the spinner/agitator spins within and relative to the basket at a first speed effective to agitate the particulate material and thus to break-up solid waste in the basket,
  iii) a second spinning mode in which the basket spins within and relative to the housing at a second speed faster than said first speed and effective to provide centrifugal forces effective to remove wastewater from the basket.
g) a water inlet effective to provide water to the interior of the basket; and
h) a drain to drain wastewater from the housing.

A method for using the inventive device may comprise:
a) providing a pet sanitation device comprising:
  i) a housing comprising a water-retaining sidewall and a water-retaining floor with a drain effective to drain water from the housing;
  ii) a basket positioned within said housing and spaced apart from said housing, the basket comprising a bowl with openings to allow water to drain from the sides and bottom of the basket upon rotation of the basket, and defining a central axis;
  iii) a spinner/agitator positioned within the basket and adapted to spin around said central axis and effective to agitate washable particulate material in the basket;
  iv) a washable particulate material contained in the basket;
  v) a motor effective for selectively spinning the basket and/or the spinner/agitator about said central axis;
  vi) a spinning control mechanism effective to control the timing and speed at which the spinner/agitator spins within the basket and the timing and speed at which the basket spins within the housing, wherein said spinning control is effective to provide:
    A) a non-spinning mode in which the spinner/agitator does not spin within the basket and the basket does not spin within the housing;
    B) a first spinning mode in which the spinner/agitator spins within and relative to the basket at a first speed effective to agitate the particulate material and thus to break-up solid waste in the basket,
    C) a second spinning mode in which the basket spins within and relative to the housing at a second speed faster than said first speed and effective to provide centrifugal forces effective to remove wastewater from the basket.
  vii) a water inlet effective to provide water to the interior of the basket; and
  viii) a drain to drain wastewater from the housing.
b) allowing a pet to enter said device, to deposit pet waste in the device, and subsequently to leave the device;

c) causing water to spray into said basket to soak the waste and particulate litter material contained in the basket;
d) causing said spinner/agitator to be in a first spinning mode in which the spinner/agitator spins within and relative to the basket at a first speed effective to agitate the particulate material and thus to break-up solid waste in the basket;
e) subsequently causing said spinner/agitator to be in a second spinning mode in which the basket spins within and relative to the housing at a speed faster than said first speed and effective to cause centrifugal forces to cause wastewater to be removed from the basket; and
f) draining wastewater from the housing.

DESCRIPTION OF PREFERRED EMBODIMENTS

Figure 1:
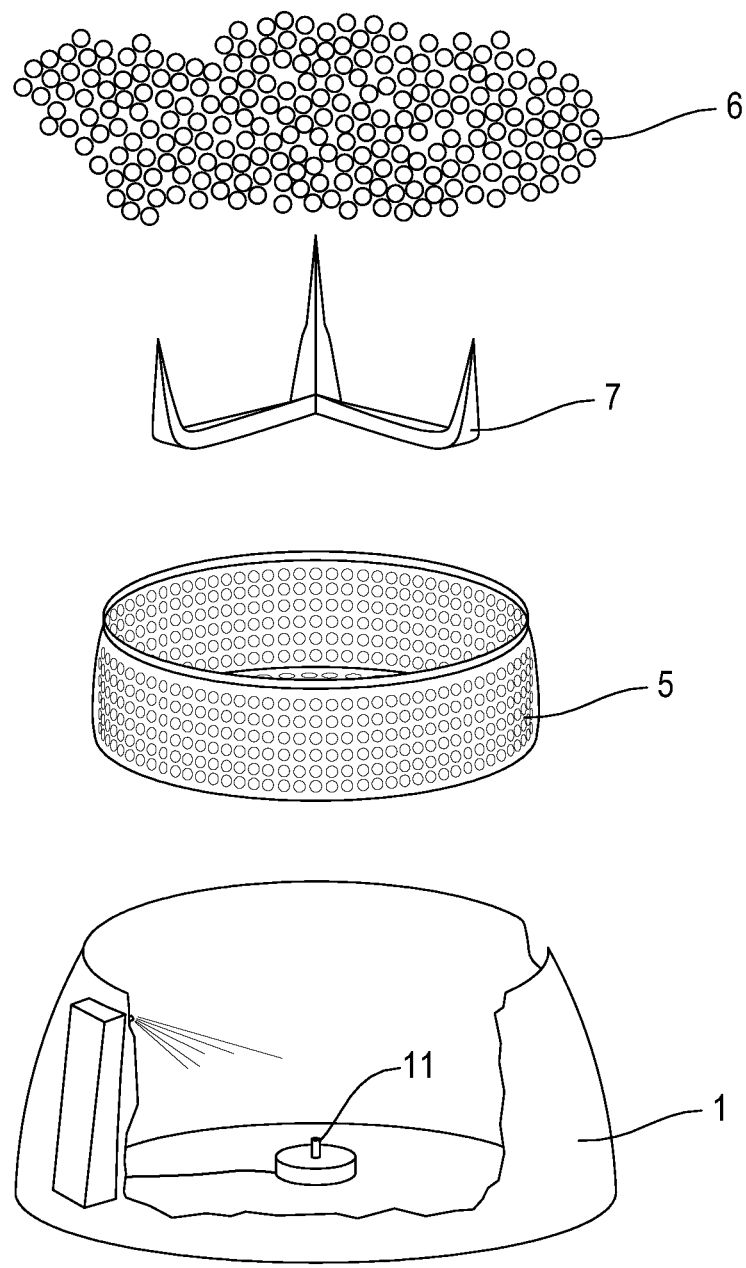
FIG. 1 shows the various primary components of the inventive pet sanitation device according to one embodiment.
Figure 2:
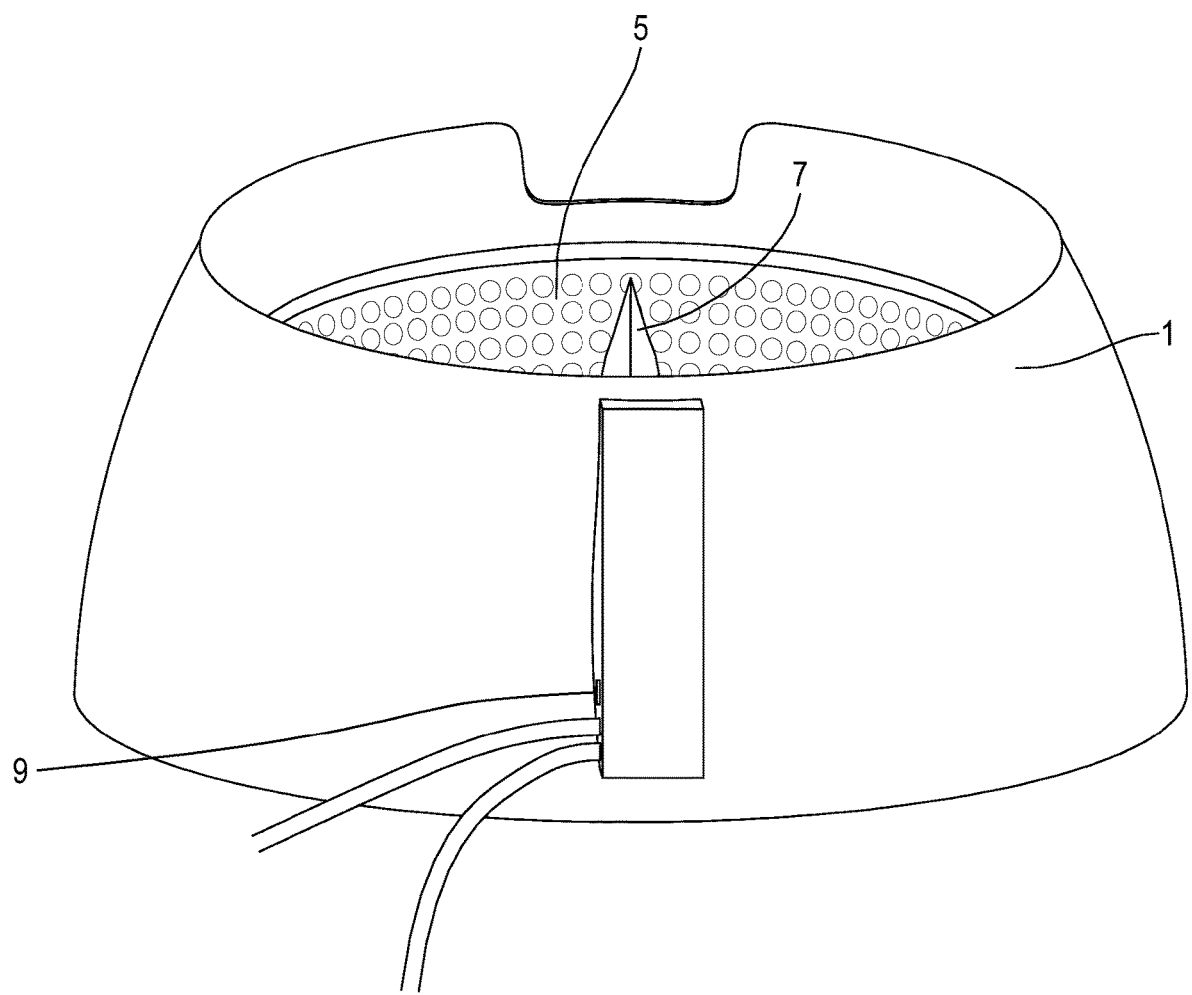
FIG. 2 is a perspective view of the inventive pet sanitation device according to one embodiment.
Figure 3:
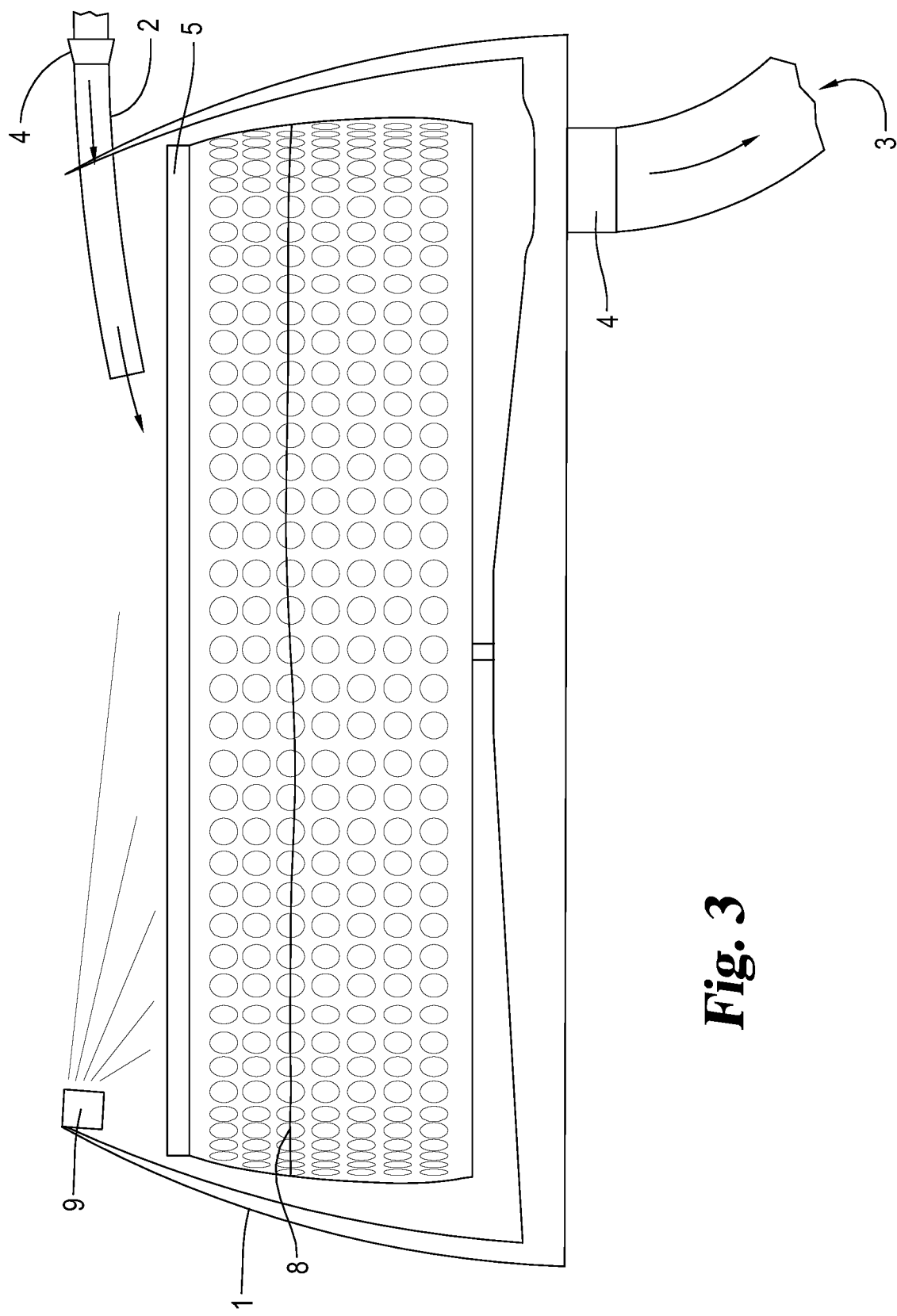
FIG. 3 is a side elevation view, in section, of the inventive pet sanitation device according to one embodiment.

For the purposes of promoting an understanding of the principles of the invention, reference will now be made to certain embodiments and specific language will be used to describe the same. It will nevertheless be understood that no limitation of the scope of the invention is thereby intended, with such alterations and modifications to the illustrated device being contemplated as would normally occur to one skilled in the art to which the invention relates.

As indicated above, one aspect of the present invention provides a pet sanitation device comprising a litter-containing basket in a housing. After a pet uses the device, the housing and basket are filled with water to begin dissolving the waste in the litter, thus producing wastewater. The basket is caused to spin about a central axis in the housing, and the spinning motion causes the litter to move within the basket. The movement of the litter in the basket agitates the solid waste material and helps to break-up the waste, making the dissolution process easier and faster. The spinning motion also produces centrifugal forces that force the wastewater outward from the basket and into the space between the basket and the housing. The wastewater is drained from the housing, leaving the device ready for a subsequent use.

In one embodiment the device may comprise:
a) a housing comprising a water-retaining sidewall and a water-retaining floor with a drain effective to drain water from the housing;
b) a basket positioned within said housing and spaced apart from said housing, the basket comprising a bowl with openings to allow water to drain from the sides and bottom of the basket upon rotation of the basket, and defining a central axis;
c) a spinner/agitator positioned within the basket and adapted to spin around said central axis and effective to agitate washable particulate material in the basket;
d) a washable particulate material contained in the basket;
e) a motor effective for selectively spinning the basket and/or the spinner/agitator about said central axis;
f) a spinning control mechanism effective to control the timing and speed at which the spinner/agitator spins within the basket and the timing and speed at which the basket spins within the housing, wherein said spinning control is effective to provide:
  i) a non-spinning mode in which the spinner/agitator does not spin within the basket and the basket does not spin within the housing;
  ii) a first spinning mode in which the spinner/agitator spins within and relative to the basket at a first speed effective to agitate the particulate material and thus to break-up solid waste in the basket,
  iii) a second spinning mode in which the basket spins within and relative to the housing at a second speed faster than said first speed and effective to provide centrifugal forces effective to remove wastewater from the basket.
g) a water inlet effective to provide water to the interior of the basket; and
h) a drain to drain wastewater from the housing.

1. THE HOUSING

The inventive device comprises an outer housing. The outer housing is open at the top and/or the side (preferably the upper portion of the side) to allow a pet to enter the device, but is otherwise generally effective for retaining water. Accordingly, the outer housing preferably comprises a water-retaining sidewall connected to a water-retaining floor. A wastewater drain is provided in the floor and is effective to drain water from the housing.

The preferred housing has a bowl shape with an inner wall that is substantially the same shape as the shape of a basket contained within. Other shapes may be used if desired.

The sidewall(s) of the outer housing extend(s) upward at least as high as the "fill" height of the litter contained in the basket in the housing. Preferably the sidewall(s) extend(s) upward for a height of about 2-10 inches above the fill height, and more preferably about 2-6 inches above the fill height. Most preferably the sidewall(s) of the outer housing extend(s) upward approximately 2-4 inches about the "fill" height of the litter in the inner basket.

The housing is effective to collect wastewater that is removed from the spinning basket within, and to direct that wastewater to a drain that allows the wastewater to be removed from the basket. Accordingly, the preferred housing has a sloped or bowl-shaped floor that directs wastewater to a drain area in the bottom or side of the housing. In some preferred embodiments the floor slopes downward toward the outside, with the center being slightly raised to facilitate draining of collected waste fluid in the area around an outer waste outlet drain. In other embodiments the floor slopes downward toward the center, with the center being slightly lower to facilitate draining of collected waste fluid in the area around a central waste outlet drain.

The drain is effective for removing wastewater from the housing after use. In some embodiments the drain is plumbed into a wastewater line, such as a toilet waste line. The drain is preferably gravity fed, although one or more pumps may be included in the drain line before or after the drain line leaves the device. Optional filters to catch solid waste from the drain line may also be included.

The housing may also be effective for supporting one or more water inlet lines. The water inlet lines are preferably effective for providing sufficient water at sufficient pressure to fill the device in no more than several minutes.

The housing may also be effective for supporting one or more sensors that detect the presence of a pet within the housing. The sensors are effective for detecting when a pet enters and/or leaves the device, and are effective for sending a signal to a controller to initiate the cleaning action after a pet has entered and subsequently left the device.

The housing may be made of plastic or metal or another substantially rigid material.

The preferred outer housing is substantially bowl-shaped with a diameter that is preferably between about 16 inches and about 24 inches, and more preferably is about 20 inches, although larger or smaller sizes may be appropriate for some pets, including dogs as well as cats. The housing preferably has a height of about 6 inches to about 12 inches, and more preferably about 8 inches.

The housing may be associated with other features such as a ramp to facilitate entry by pets into the device. A top or cover may also be provided. The housing may also include or support a fan and/or air cleaning device.

2. THE BASKET

A basket is provided inside the outer housing. The basket preferably comprises a cylindrical- or bowl-shaped device with a plurality of openings. A plurality of openings is preferably provided in the basket sides and in the basket floor. The openings are sized to allow wastewater to pass from the inside of the basket while preventing the washable particulate material from passing from the basket through the sides or bottom.

The basket may be made of a metal or plastic screen-type material with an opening size that is smaller than the size of the litter material.

The basket is preferably removable to allow the basket to be cleaned.

The basket openings preferably extend substantially all around the sides and bottom of the basket, although the uppermost portion of the sidewall may be solid without openings. In one embodiment the openings are provided to a height that indicates the preferred "fill" depth of litter in the basket. A short (preferably less than 4 inches), solid or perforated portion extends above the "fill" height of the basket to retain excess litter if the basket is over-filled.

The basket openings may be round or elliptical or oblong or rectangular or another shape. The openings are sized to prevent the washable particulate material from leaving the basket when the basket is spinning at a rotational speed of at least 200 rpm. The openings are also sized to allow water to be removed from the basket by the centrifugal forces that are created when the basket is spinning at a rotational speed of at least 200 rpm.

The basket may be made of plastic or metal or another substantially rigid material. The basket is strong enough to support the combined weight of a 15 pound pet and 5 pounds of washable particulate material when the pet is using the device.

The basket defines a central axis about which the basket can spin. The central axis is typically generally perpendicular to the bottom/floor of the basket and generally parallel to the sidewalls of the basket.

The preferred basket is substantially bowl-shaped with a diameter that is preferably slightly smaller than the housing diameter, i.e., about 14-15 inches to 22-23 inches, and more preferably is about 18-19 inches, although larger or smaller sizes may be used. The basket also preferably has a height of about 4 inches to about 10 inches, and more preferably about 6 inches.

In some embodiments the floor of the basket is slightly raised near the center and slightly lower near the outside. This facilitates the outward movement of the particulate material and helps break-up waste material.

3. THE WASHABLE PARTICULATE MATERIAL

The washable particulate material functions as the "litter" in the device. The preferred material does not absorb or retain waste or waste odors. In some preferred embodiments the washable particulate material comprises glass, metal, or plastic beads with a diameter of about 3 mm to about 15 mm. In the most preferred embodiments the particulate material is glass beads with a diameter of 8 mm-14 mm, more preferably 10 mm-12 mm, and most preferably about 11 mm.

The washable particulate material (alternatively referred to herein as "litter"), may comprise a plurality of spherical pieces, or it may comprise a plurality of pieces of another shape. The pieces may have a smooth, outer surface, or they may have surface features that provide a hydrophobic surface. Generally, the particles are provided with an outer surface that does not hold or retain waste and/or odors.

The washable particulate material provides a substrate that moves within the basket during the spinning action to help break-up the solid waste and to speed the dissolution process. The washable particulate material also helps satisfy the digging and burying instinct that some pets have for their waste.

The preferred litter material is glass beads with a smooth outer surface that is free from cracks or holes or crevices or other places where waste may be retained. The preferred bead size is between about 8 mm and about 14 mm, with particle sizes of about 10 mm to about 12 mm being more preferred, and about 11 mm being most preferred.

The washable particulate material has a shape and hardness that aids in breaking-up and dissolving waste material when the particles are agitated by the motion of the spinner/agitator in the basket. Additionally, soap or another cleaning agent may be added to or incorporated into the particulate material to assist with waste disposal. Similarly, soap or another cleaning agent may be added by including a mechanism to add a detergent with the water, or by using grindable and/or slow release detergent beads.

The litter is provided in the basket to a depth of between about 1" and 4", with a depth of about 2" to about 3" being preferred. The basket may include a "fill line" or other indicator of the appropriate fill depth for the litter.

4. THE SPINNER/AGITATOR

The device includes one or more spinner/agitators/agitators that may be caused to spin in the basket at a speed effective to agitate the litter/beads, and thus to break-up waste material to make it easier to remove the waste from the basket.

The spinner/agitators/agitators may have two arms extending from a central axis, much like a propeller, or they may have three arms or four or more arms. The central axis around which the spinner/agitators spin may be, and preferably is, the central axis around which the basket is adapted to spin.

The spinner/agitator arms may be shaped with a leading face that is convex, and a trailing face that is concave. The spinner/agitator arms may also have a bottom face, which may be flat in the (longitudinal) direction in which the spinner/agitator spins, and may be flat and/or shaped with the same shape as the shape of the basket floor in the direction extending radially from the central axis.

The spinner/agitators/agitators are preferably positioned to that their bottoms are slightly, e.g., ⅛ inch to ½ inch above the basket floor, and preferably extend from the center of the basket to a short distance, e.g., ⅛ inch to ½ inch, from the inside of the basket wall.

The spinner/agitators/agitators preferably have three or more spinning modes. In a non-spinning mode the spinner/agitator does not spin within and relative to the basket and the basket does not spin within and relative to the housing. In a first spinning more the spinner/agitator spins within and relative to the basket but the basket does not necessarily spin within and relative to the housing. In a second spinning mode the basket spins within and relative to the housing but the spinner/agitator does not necessarily spin within and relative to the basket but. In an optional third spinning mode the basket spins within and relative to the housing and the spinner/agitator spins within and relative to the basket. In this optional third spinning mode the spinner/agitator may spin in the same direction (e.g., clockwise) as the basket, or it may spin in the opposite (e.g., counterclockwise) direction. When the spinner/agitator spins in the same direction (e.g., clockwise) as the basket, it may spin at the same speed as the basket or it may spin at a speed that is different from the speed at which the basket is spinning. When the spinner/agitator is spinning at a speed that is different from the speed at which the basket is spinning, the spinner/agitator speed may be faster than or slower than the speed at which the basket is spinning.

In some embodiments the spinner/agitators/agitators are easily removable to allow the part to be cleaned.

5. THE SPINNING MECHANISM AND CONTROL

The device includes a spinning mechanism effective to spin the spinner/agitator within the basket at a first, relatively slower speed effective to break-up waste material in the basket. The movement of the particulate material (e.g., glass beads) against the waste causes the waste to break up and to go into a solution/dispersion in the water that has been sprayed into the basket.

The spinning mechanism is also effective to spin the basket, and the litter contained therein, within the housing at a second, relatively faster speed effective to produce centrifugal forces that are sufficient to move wastewater from the basket to the space between the basket and the housing.

An electric motor is preferably used to power the spinning mechanism. The motor preferably is effective to spin the filled and waste-laden basket at a speed of at least 200 rpm, and more preferably at a speed of at least 240 rpm. The motor is also preferably effective to spin the spinner/agitator within and relative to the waste-laden basket at a speed of at least 20 rpm, and more preferably at a speed of between 40 rpm and 120 rpm. The motor and control may be effective for allowing the user to vary the speed at which the spinner/agitator spins within the basket and/or the speed at which the basket spins within the housing.

The basket preferably includes or is connected to a shaft connected to the motor. The shaft defines the axis of rotation of the basket, and of the spinner/agitator within the basket. When the motor turns the shaft, the basket spins about the central axis and/or the spinner/agitator spins about the central axis.

The spinning mechanism preferably includes a spinning control mechanism effective to control the timing and speed at which the basket spins within the housing and the timing and speed at which the spinner/agitator spins within the basket. The spinning control is preferably effective to provide:

1) a non-spinning mode in which the spinner/agitator does not spin within and relative to the basket and the basket does not spin within and relative to the housing;

2) a first spinning mode in which the spinner/agitator spins within and relative to the basket at a first speed effective to agitate the particulate material and thus to break-up solid waste in the basket (i.e., a first, relatively slower speed);

3) a second spinning mode in which the basket spins within and relative to the housing at a second speed faster than said first speed and effective to provide centrifugal forces effective to remove wastewater from the basket (i.e., a second, relatively faster speed).

In the first spinning mode the basket may or may not spin within and relative to the housing while the spinner/agitator is spinning within and relative to the basket.

In the second spinning mode the spinner/agitator may or may not spin within and relative to the basket while the basket is spinning within and relative to the housing.

Accordingly, the spinning mechanism is preferably effective for operating in a first spinning mode in which the spinner/agitator spins within and relative to the basket at a first speed effective to agitate the particulate material and thus to break-up solid waste in the basket, while the basket does not spin within the housing; and a second spinning mode in which the basket spins within and relative to the housing at a second speed faster than said first speed and effective to provide centrifugal forces effective to remove wastewater from the basket while the spinner/agitator does not spin within and relative to the basket.

Similarly, the spinning mechanism is preferably effective for operating in a first spinning mode in which the spinner/agitator spins within and relative to the basket at a first speed effective to agitate the particulate material and thus to break-up solid waste in the basket, while the basket spins within the housing; and a second spinning mode in which the basket spins within and relative to the housing at a second speed faster than said first speed and effective to provide centrifugal forces effective to remove wastewater from the basket while the spinner/agitator spins within and relative to the basket.

In all embodiments the direction of spin for the spinner/agitator may be clockwise or counterclockwise when viewed from above. Similarly, the direction of spin for the basket within the housing may be clockwise or counterclockwise when viewed from above. Further, the direction of spin of the spinner/agitator may be the same as, or opposite to, the direction of spin of the basket within the housing; i.e., the spinner/agitator may spin clockwise within the basket and the basket may spin clockwise within the housing, or the spinner/agitator may spin counterclockwise within the basket and the basket may spin counterclockwise within the housing, or the spinner/agitator may spin clockwise within the basket and the basket may spin counterclockwise within the housing, or the spinner/agitator may spin counterclockwise within the basket and the basket may spin clockwise within the housing.

6. WATER FLOW

A water inlet and a wastewater drain/outlet are preferably provided. The water inlet provides water to the interior of the basket and the wastewater outlet drains water from the interior of the housing.

The water inlet may provide water to multiple areas of the basket to facilitate fast filling and to "wash" multiple areas of the basket simultaneously. The water may be provided as a stream or a spray.

The wastewater drain allows wastewater to flow from the inside of the housing when the wastewater drain is open. When the wastewater drain is closed the water will fill the housing and basket to a level at or somewhat above the upper surface of the litter.

On some embodiments the device is plumbed into existing water/sewer lines like a toilet is. The device may be plumbed into existing toilet plumbing so that water goes into the device and drains into a toilet bowl.

A cleaning solution/disinfectant may be added to the water line. A cartridge containing the cleaning/disinfecting solution may be added to the water inlet line to dispense cleaner/disinfectant into the water.

7. PET SENSOR

The device may include a sensor to detect the presence of a pet in the device. The device may also include a sensor to detect when a pet leaves the device. The pet sensor may be linked to the water flow and/or to the spinning mechanism to assist in having the device fill with water and spin after a pet enters, uses, and leaves the device, but to avoid having the device fill with water and/or spin while a pet is present in the device

8. OPTIONAL ACCESSORIES AND FEATURES

In alternative embodiments the device may include a side wall extender to extend the side wall to a greater height such as may be needed for dogs of for cats that are more aggressive with their liter-scratching action.

The device may also include an attachable sold or liquid waste dispenser.

The device may also include a travel lid for use when transporting the device.

The device may also include a timer to allow the device to spin and clean at a set time. This is particularly preferred when the device does not include a pet sensor.

In other embodiments the device may include a mechanism to add a detergent with the water, and/or may include grindable/slow release detergent beads.

When used with older pets, the device may include a ramp up to the entrance to facilitate entry into the device.

When used with larger pets, such as dogs, the device may include an attachable pee wall to keep the area surrounding the device clean.

9. USE OF THE DEVICE

In operation, the device begins in a non-spinning state with the waste valve closed and no water in the device. A pet enters the device and the sensor detects the presence of the pet. The pet goes to the bathroom in the litter and leaves the device. The sensor detects that the pet has left the device, and water is then introduced into the device and is allowed to rise to a level above the level of the litter.

As water fills the basket and the bowl, the solid waste in the basket is dissolved into the water but is not absorbed by the litter. The spinner/agitator may then be caused to spin in the basket at a speed effective to agitate the litter/beads, and thus to break-up waste material to make it easier to remove from the basket. Once the waste material has been satisfactorily agitated, the spinner/agitator may be stopped or it may be allowed to continue to spin.

The waste and dissolved solids are then removed from the basket by causing the basket to spin around its central axis at a speed sufficient to cause centrifugal forces to force the water and dissolved waste from the basket and into the bowl. The basket may spin in a direction that is different from the direction in which the spinner/agitator was spinning, or it may spin in the same direction as the direction in which the spinner/agitator was spinning.

The waste valve is opened and the waste water is removed from the device. The basket may begin spinning at essentially any stage in the process after the pet has left the device, including before water is introduced into the basket.

In view of the above it can be seen that the present invention provides a method for cleaning a pet litter box. The method comprises:
 a) providing a pet sanitation device comprising:
  i) a housing comprising a water-retaining sidewall and a water-retaining floor with a drain effective to drain water from the housing;
  ii) a basket positioned within said housing and spaced apart from said housing, the basket comprising a bowl with openings to allow water to drain from the sides and bottom of the basket upon rotation of the basket, and defining a central axis;
  iii) a spinner/agitator positioned within the basket and adapted to spin around said central axis;
  iv) a motor effective for spinning the basket and/or the spinner/agitator about said central axis;
  v) a washable particulate material contained in the basket;
  vi) a water inlet effective to provide water to the interior of the basket; and
  vii) a spinning control mechanism effective to control the timing and speed at which the basket spins within the housing and the timing and speed at which the spinner/agitator spins within the basket, wherein said spinning control is effective to provide:
   A) a non-spinning mode in which the spinner/agitator does not spin within the basket and the basket does not spin within the housing;
   B) a first spinning mode in which the spinner/agitator spins within and relative to the basket at a first speed effective to agitate the particulate material and thus to break-up solid waste in the basket,
   C) a second spinning mode in which the basket spins within and relative to the housing at a second speed faster than said first speed and effective to provide centrifugal forces effective to remove wastewater from the basket, and
   D) an optional third spinning mode in which the basket spins within the housing while the spinner/agitator spins within the basket;
 b) allowing a pet to enter said device, to deposit pet waste in the device, and subsequently to leave the device;

c) causing water to spray into said basket to provide water to the interior of the basket;

d) causing said spinner/agitator to be in a first spinning mode in which the spinner/agitator spins within and relative to the basket at a speed effective to agitate the particulate material and thus to break-up solid waste in the basket;

e) subsequently causing said spinner/agitator to be in a second spinning mode in which the basket spins within and relative to the housing at a speed effective to cause centrifugal forces to cause wastewater to be removed from the basket; and f) draining wastewater from the housing.

10. DISCUSSION OF THE DRAWINGS

Referring now to the drawings, the inventive device comprises a housing that is preferably shaped as a bowl (1) and is provided with a water inlet (2) and a wastewater drain (3). One or more valves (4) control the flow of water into and out of the bowl.

Basket (5) is contained in the bowl and is spaced apart from the bowl. A non-absorbable litter material (6) is contained in the basket. The basket has openings configured to retain the non-absorbable litter material in the basket while still allowing water to drain from the sides and bottom of the basket.

A motor (not shown) is provided to spin the basket within the bowl at a speed effective to create centrifugal forces effective to force liquid from the non-absorbable litter to the space between the basket and the bowl. The wastewater then collects at the bottom of the bowel and is drained from the bowl through the wastewater drain.

One or more structures such as ribs (7) may be provided to agitate the spinning litter and waste to facilitate the waste dissolution process. Such structures may also or alternatively be scrappers that scrape litter from the inside of the basket so that the litter is agitated to facilitate the waste removal process.

One or more sensors (9) may be provided to detect the presence of a pet in the device. The sensors detect when a pet has entered the device and may also detect when the pet has left the device.

In operation, the device begins in a non-use state with the waste valve closed and no water in the device. A pet enters the device and the sensor detects the presence of the pet. The pet goes to the bathroom in the litter and leaves the device. The sensor detects that the pet has left the device, and water in then introduced into the device and is allowed to rise to a level above the level of the litter.

As water fills the basket and the bowl, the solid waste in the basket is dissolved into the water but is not absorbed by the litter. The waste and dissolved solids are removed from the basket by causing the basket to spin around a central axis at a speed sufficient to cause centrifugal forces to force the water and dissolved waste from the basket and into the bowl. The waste valve is opened and the waste water is removed from the device. The basket may begin spinning at essentially any stage in the process after the pet has left the device, including before water is introduced into the basket.

Agitation of the litter and the waste in the basket is optionally provided. For example, stationary or movable ribs or arms may scrape down the sides of the spinning basket to agitate the spinning litter and waste and to facilitate the waste dissolution process.

Referring now to FIGS. 4-9, FIG. 4 shows one preferred embodiment of the spinner/agitator used in the present invention. Spinner/agitator 400 includes spinner/agitator arms 401*a-c* extending from central hub 402. Central hub 402 allows the spinner/agitator to spin around the central axis of the device. Spinner/agitator arms 401*a-c* each have a convex leading face and a concave trailing face, with the illustrated arms being positioned so spin in a counterclockwise direction. Basket 410 with basket wall 411 and basket floor 412 is also illustrated.

Figure 4:
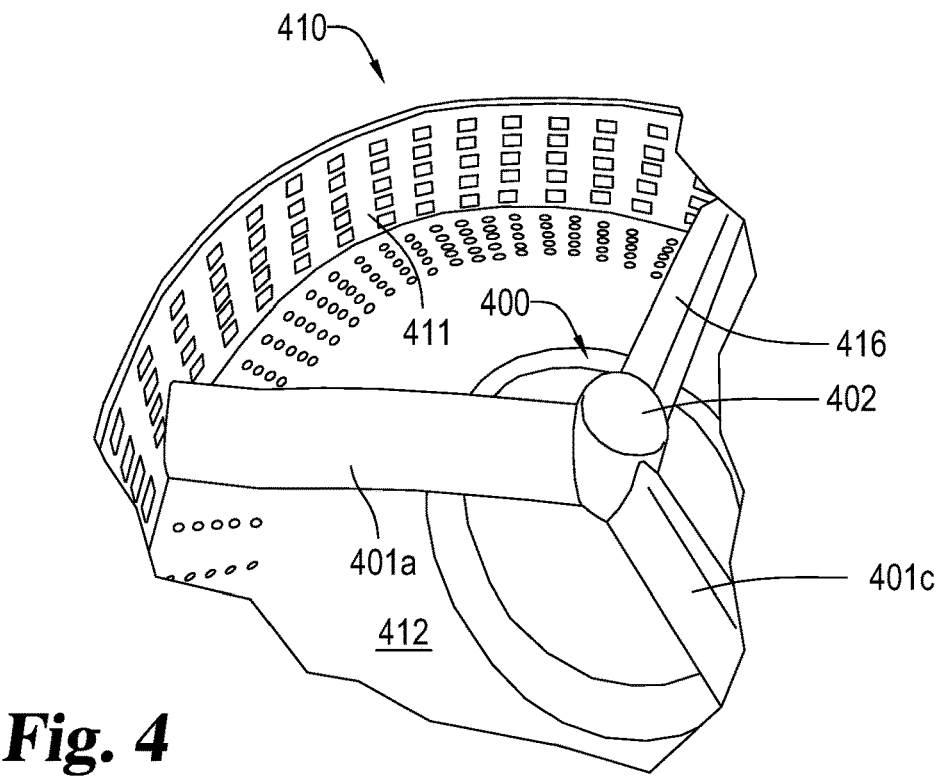
FIG. 4 shows one embodiment of the spinner/agitator used in a preferred embodiment of the present invention.
Figure 5:
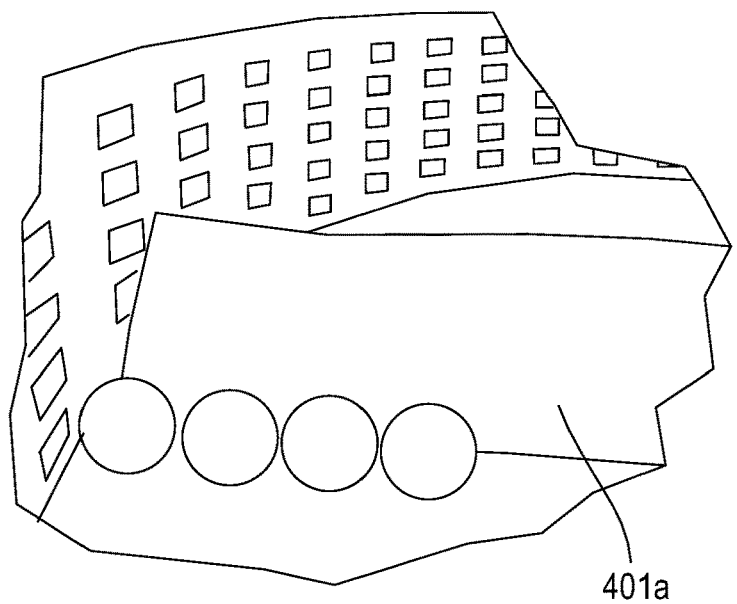
FIG. 5 is another view of the arm used in the spinner/agitator of FIG. 4.

FIG. 5 is another view of the arm used in the spinner/agitator of FIG. 4, with several 11 mm glass beads being positioned adjacent the spinner/agitator for perspective.

Figure 6:
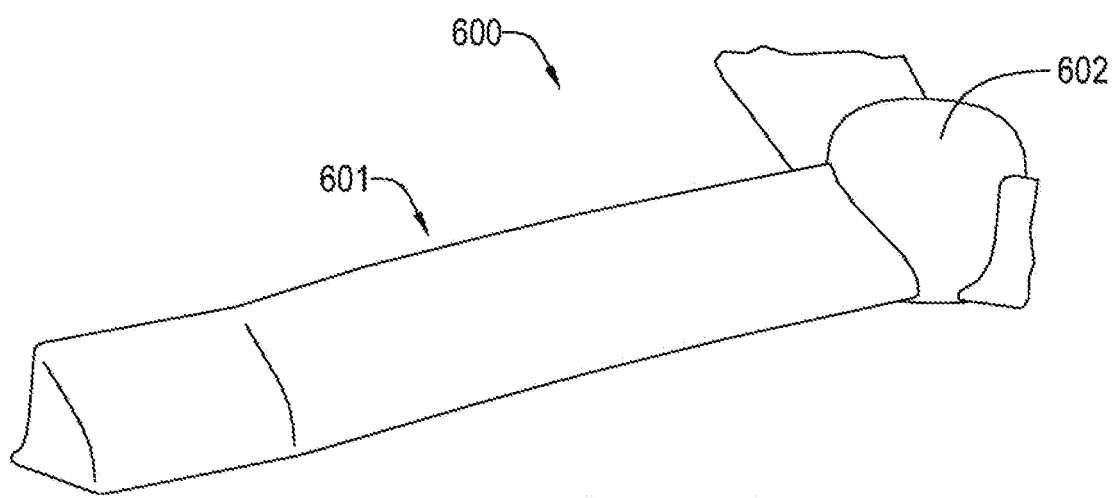
FIG. 6 illustrates another embodiment of a spinner/agitator arm used in a preferred embodiment of the present invention.

FIG. 6 illustrates another embodiment of a spinner/agitator arm used in a preferred embodiment of the present invention. Spinner/agitator 600 includes spinner/agitator arms 601*a* through 601*c* extending from hub 602. Each of the arms 601*a-c* has a convex leading face, a concave trailing face, and a flat bottom face.

Figure 7:
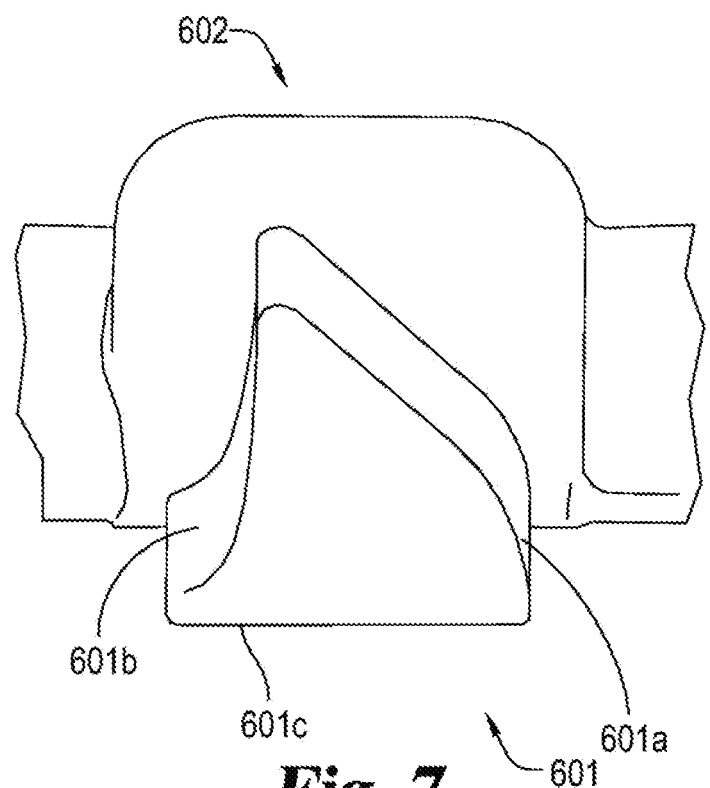
FIG. 7 is an end view of the arm used in the spinner/agitator of FIG. 6, showing the convex leading face, the concave training face, and the flat bottom face.

FIG. 7 is an end view of the arm used in the spinner/agitator of FIG. 6, showing convex leading face 601*a*, concave trailing face 601*b*, and flat bottom face 601*c*.

Figure 8:
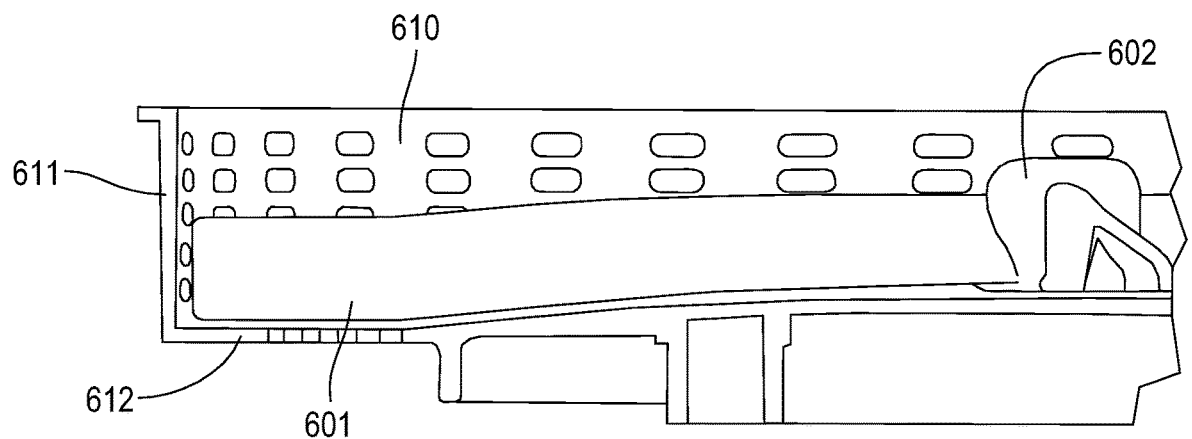
FIG. 8 is a perspective view of the arm used in the spinner/agitator of FIG. 6, showing the flat bottom face conforming to the basket floor.

FIG. 8 is a perspective view of the arm used in the spinner/agitator of FIG. 6, showing the flat bottom face conforming to the basket floor. In the illustrated basket 610 the basket floor 612 is higher near the center than it is along the outer portion of the basket. Spinner/agitator arms 601 therefore slope downward slightly from the center to the outer portion, where the arms straighten to a horizontal outer portion. Spinner/agitator arms 601 extend to within about ½" from basket wall 611.

Figure 9:
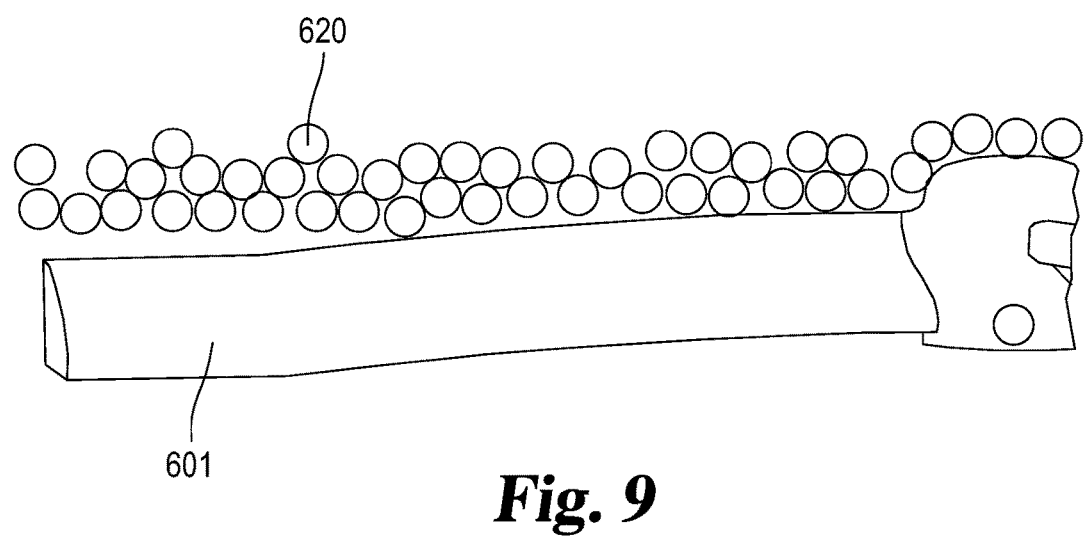
FIG. 9 is a perspective view of the arm used in the spinner/agitator of FIG. 6, showing the flat bottom face conforming to the basket floor and additionally showing the depth of the preferred glass beads relative to the arm.

FIG. 9 is a perspective view of the arm used in the spinner/agitator of FIG. 6, showing the flat bottom face conforming to the basket floor and additionally showing the preferred depth of the preferred 11 mm glass beads 620 relative to the arm. The device is filled so that there is an approximately two-bead depth of beads above the outer portion of the spinning arm, and an approximately one-bead depth of beads above the center portion of the spinning arm. In other embodiments the device is adapted to have an approximately three-bead depth of beads above the outer portion of the spinning arm, and an approximately two-bead depth of beads above the center portion of the spinning arm.

While the invention has been illustrated and described in detail in the drawings and foregoing description, the same are to be considered as illustrative and not restrictive, it being understood that only certain preferred embodiments have been shown and described and that all changes and modifications that come within the spirit of the invention are desired to be protected. In addition, it is to be appreciated that the present invention may comprise or consist essentially of any or all of the illustrated or described features. For example, the present invention includes devices comprising each of the embodiments illustrated in FIGS. 1 through 9, and the present invention includes devices consisting essentially of any of the embodiments illustrated in FIGS. 1 through 9. Additionally, any or all of the features and/or embodiments disclosed herein may be combined with any or all of the other features and/or embodiments disclosed herein to provide a device that comprises or consists essentially of such features.

The invention claimed is:

1. A pet sanitation device comprising:

a) a housing comprising a water-retaining sidewall and a water-retaining floor with a drain effective to drain water from the housing;

b) a basket positioned within the housing and spaced apart from the housing, the basket comprising sides and a bottom, with openings to allow water to drain from the sides and bottom of the basket upon rotation of the basket, and defining a vertical axis;

c) a scraper positioned adjacent an inner wall of the basket and effective to prevent said washable particulate material from clumping against an inside of the basket bottom and/or an inside of the basket sides while the basket is spinning, wherein said housing is open at a top while the basket is spinning;

d) a washable particulate material contained in the basket;

e) a motor effective for selectively spinning the basket and/or the scraper about the vertical axis;

f) a spinning control mechanism effective to control the timing and speed at which the scraper spins within the basket and the timing and speed at which the basket spins within the housing, wherein said spinning control mechanism is effective to provide:

i) a non-spinning mode in which the scraper does not spin within the basket and the basket does not spin within the housing;

ii) a first spinning mode in which the scraper spins within and relative to the basket at a first speed effective to agitate the particulate material and thus to break-up solid waste in the basket, iii) a second spinning mode in which the basket spins within and relative to the housing at a second speed faster than said first speed and effective to provide centrifugal forces effective to remove wastewater from the basket;

g) a water inlet effective to provide water to the interior of the basket;

h) the drain to drain wastewater from the housing;

i) a sensor effective to detect the presence of a pet in the basket and also effective to detect the absence of a pet in the basket; and j) a controller to receive a signal from the sensor indicating that a pet has been present in the basket and has subsequently left the basket, and subsequently to cause the motor to rotate the basket at a speed effective to cause water to be driven by centrifugal forces to the space between the basket and the housing;

k) wherein said motor and spinning control mechanism are effective for spinning the basket about its vertical axis at a speed of at least 200 rotations per minute.

2. The device of claim 1 wherein said motor and spinning control mechanism are effective for spinning the scraper about its central axis at a speed of at least 40 rotations per minute.

3. The device of claim 1 wherein said scraper comprises a hub and two or more arms extending radially therefrom, with each of said arms having a convex leading face and a concave trailing face.

4. The device of claim 3 wherein each of said arms has a flat bottom face.

* * * * *